J. WILLY.
MECHANISM FOR THE OBTAINMENT OF MOTIVE POWER FROM WAVES OF THE OCEAN, LAKES, OR OTHER LARGE BODIES OF WATER.
APPLICATION FILED SEPT. 8, 1909. RENEWED OCT. 1, 1912.

1,045,654.

Patented Nov. 26, 1912.
4 SHEETS—SHEET 1.

UNITED STATES PATENT OFFICE.

JOHN WILLY, OF LOS ANGELES, CALIFORNIA.

MECHANISM FOR THE OBTAINMENT OF MOTIVE POWER FROM WAVES OF THE OCEAN, LAKES, OR OTHER LARGE BODIES OF WATER.

1,045,654.  Specification of Letters Patent.  Patented Nov. 26, 1912.

Application filed September 8, 1909, Serial No. 517,725. Renewed October 1, 1912. Serial No. 723,434.

*To all whom it may concern:*

Be it known that I, JOHN WILLY, of the city of Los Angeles, in the county of Los Angeles, in the State of California, have invented Improved Mechanism for the Obtainment of Motive Power from Waves of the Ocean, Lakes, or other Large Bodies of Water, of which the following is a full, clear, and exact specification, reference being had to the annexed drawings and to the letters and figures marked thereon.

My said invention which relates to the obtainment of motive power, from the waves of an ocean, sea or lake, at and near to the sloping coasts or shores thereof, has for its object to utilize the energy contained in the incoming and outgoing waves at and near the coast or shore, the waves being those commonly designated as "surf waves," for operating floating paddle-wheels carried in suitable bearings and maintained in operative position by means of guides, whereby the said floating paddle-wheels rise and fall in coincidence with the rise and fall of the "surf waves."

According to my invention, the surf waves impart rotation to the paddle-wheels, with driving power operating alternately in opposite directions. The paddle-wheels convey driving power imparted to them alternately in opposite directions, by gearing operated from the shafts of said paddle-wheels in such manner as to rotate in constant direction of rotation, a line shaft carrying either belt driving pulleys, sprocket wheels, gearing, cranks, cams or eccentrics, either of which is adapted for transmitting the driving power of the line shaft either to other mechanism or apparatus, or for operating pumps wherewith to lift the water of an ocean, sea, or lake, into reservoirs at whatever height may be requisite to create a head of water for driving water-wheels, turbines, or other hydraulic operating mechanism.

My said invention also includes other features of improvement hereinafter set forth, and which will be completely understood from the subsequent parts of this specification, with reference to the accompanying drawings, of which;

Figure 1:
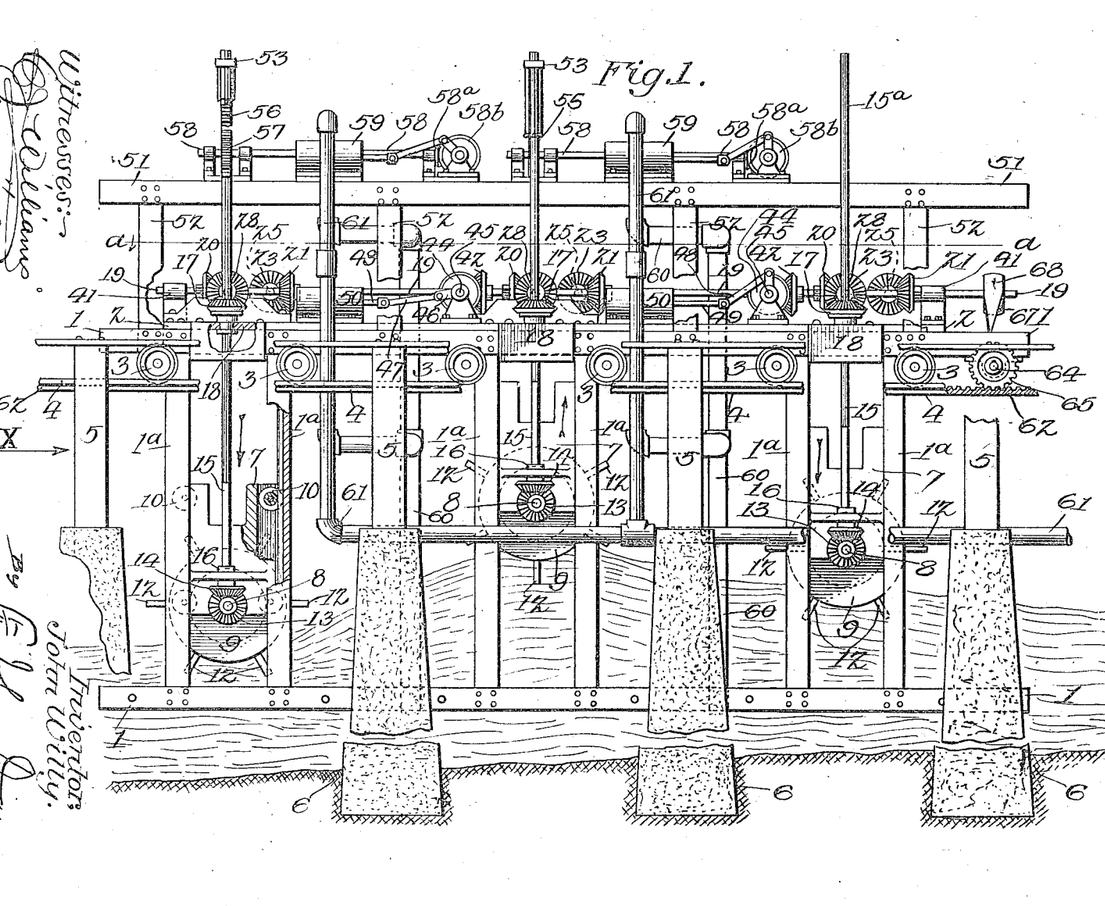
Figure 1, is a side elevation of the apparatus or mechanism constituting my said invention, showing the floating paddle driving wheels, the arrangement for enabling said wheels to rise and fall, and rotate alternately in opposite directions, by the rise and fall both of the incoming and outgoing surf waves, also showing gearing by which the alternate direction of rotation of the floating paddle-wheels is transmitted to, and converted into continuous direction of rotation of the line shaft, for transmitting continuous motion to apparatus or mechanism to be operated by my said invention.
Figure 2:
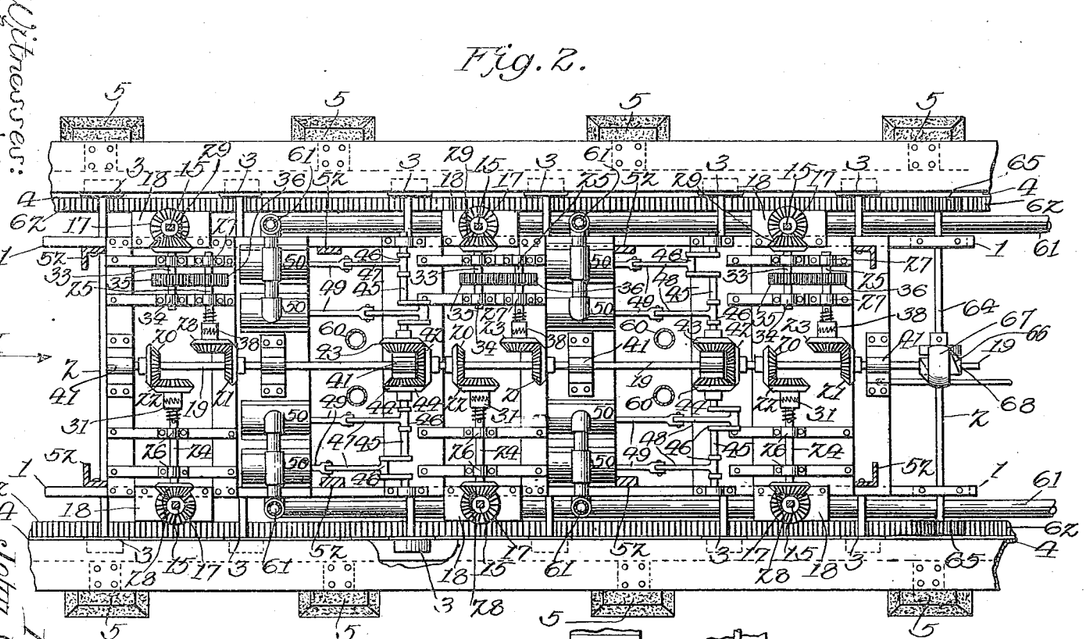
Fig. 2, is a plan corresponding to Fig. 1.
Figure 3:
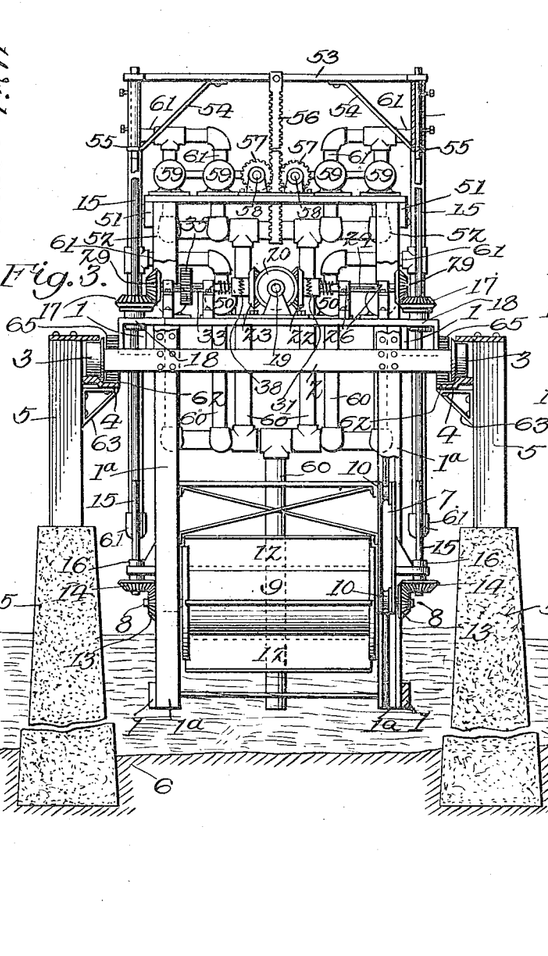
Fig. 3, is an end elevation of the same, looked at in the direction of the arrows Figs. 1, and 2.
Figure 4:
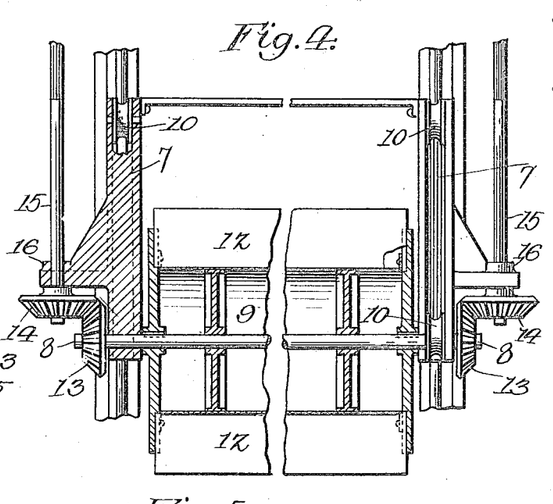
Fig. 4, is a transverse section of one of the floating paddle-wheels, the central part of which is broken out as indicating that these wheels may be of any desired length.

As shown by Figs. 1, 2, and 3, of the drawings, my apparatus or mechanism consists of a horizontal framing 1, of rectangular form in side, and end elevation, also rectangular in plan. This rectangular framing consists of the upper and lower horizontal members marked 1, and of vertical members marked 1ᵃ, more especially shown at Figs. 1, and 3, connecting the upper and lower members 1, and within and upon this rectangular framing the wave operative parts of my mechanism are carried as hereinafter described. The said rectangular framing is constructed with transverse beams 2, as shown at Figs. 2, and 3, and the outer ends of these beams constitute carriers for rollers 3, which operate upon rails 4, rigidly fastened to the upper ends of piers 5, at each side of the framing 1, and suitably formed of concrete or other material, which if necessary, may be supported on piles driven into the sand or gravel 6, constituting the shore or coast of an ocean, sea or lake, whereat my invention is erected or installed.

Between each pair of uprights 1ª, 1ª, is the carrying frame 7, these containing the bearings for the axles 8, of each floating paddle-wheel 9. The uprights 1ª, are constructed in the form of an angle iron as shown partly at the lefthand end of Fig. 1, and at both sides of Fig. 3. In the grooves of these uprights 1ª, the frame 7, are free to rise and fall with the rising and falling of each of the floating paddle-wheels 9, and with the object of reducing the friction of the movement of the framing 7, between each pair of angle iron uprights 1ª, anti-friction rollers 10, are mounted as shown partly in full, and partly in dotted lines, to maintain the rising and falling frames 7, vertically and anti-frictionally operative between the angle iron uprights 1ª, as the paddle-wheels 9, carried in bearings in the frame 7, respectively rise and fall by the incoming and outgoing surf waves.

The paddle-wheels 9, are constructed with a hollow central, cylindrical water tight body of sufficient capacity to constitute each a floating cylindrical drum upon the periphery of which the paddles 12, are rigidly fastened as hereinafter more fully described.

Upon each of the outer ends of the shafts 8, a bevel pinion 13, is fixed, so that these pinions 13, rotate with the paddle-wheels 9. Gearing into each of these bevel pinions 13, are other bevel pinions 14, one at the bottom of each vertical shaft 15. These shafts 15, are carried in vertical bearings 16, in the frames 7, and the upper parts of these vertical shafts each pass through a bevel pinion 17, each of which is carried in a bearing 18, in the top part of the horizontal beams of the framing 1, as shown in section at the lefthand end of Fig. 1, and as is obvious from the other figures of drawing.

As the several paddle-wheels 9, are rotated in two directions by the inward and outward flowing surf waves, they, by reason of the gearing of the bevel pinions 13, with the bevel pinions 14, rotate the shafts 15, while the shafts 15, rotate the bevel pinions 17, by the action of both the incoming and outgoing waves.

The line shaft to which continuous motion in one direction is imparted by the paddle-wheels driving mechanism constituting part of my invention, is the shaft marked 19, in Figs. 1, 2, and 3. Upon this shaft 19, there are keyed pairs of bevel pinions 20, and 21, respectively, facing each other. With each of the bevel pinions 20, there gears a corresponding bevel pinion 22, and with each of the bevel pinions 21, there gears a corresponding bevel pinion 23. The bevel pinions 22, are carried upon horizontal transverse shafts 24, and the bevel pinions 23, are carried upon horizontal transverse shafts 25. Each of the shafts 24, is carried in double bearings 26, and each of the shafts 25, is carried in double bearings 27, and at the outer end of each of the shafts 24, there is keyed a bevel pinion 28, each of which gears with one of the bevel pinions 17, at one side of the mechanism, through which one of the vertical shafts 15, passes. Each of the shafts 25, carries at its end a bevel pinion 23, each of which gears with a bevel pinion 17, through which the vertical shaft 15, at the opposite side of the mechanism, passes.

At the inner end of each of the shafts 24, a bevel pinion 22, provided with a slip spring clutch 31, is carried. Each of the pinions 22, gears with a corresponding bevel pinion 20, on the line shaft 19, and through this gearing and the vertical shafts 15, at one side of the mechanism, the line shaft 19, is rotatively driven from the alternately rotating paddle-wheels 9, operating this gearing through the shafts 15, at one side of the mechanism.

As the direction of rotation of the shaft 19, is as aforesaid continuous or constantly in one direction, and not rotation in alternate directions as is the rotation of each of the paddle-wheels 9, it follows that the gearing transmitting motion from the axes of the paddle-wheels at opposite sides must be so arranged as to impart direction to the line shaft 19, in constant direction of rotation. With this object in view each of the pinions 29, is carried upon a short shaft 33, rotatable in bearings 34, each such shaft 33, having secured thereon a spur pinion 35, gearing into another spur pinion 36, upon a shaft 25, each of which carries at its outer end a slip spring clutch 38, which engages with a bevel pinion 23, each of which again engages with the bevel pinions 21, keyed upon the line shaft 19, as shown more particularly in plan in Fig. 2.

The slip spring clutch 31, at one side of the machine, namely, at the lower side as shown by the plan Fig. 2, automatically engages with the bevel pinions 22, when the paddle-wheels rotate the gearing in one direction so that these bevel pinions 22, receive the motion of positive rotation in that direction, which by gearing with the bevel pinions 20, upon the line shaft enables the positive motion of the paddle-wheels operated by the action of the waves, to be transmitted to the line shaft 19. When, however, the paddle-wheels 9, rotate in the opposite direction, the slip spring clutches 31, automatically disengage their teeth from the teeth of the bevel pinions 22, and so long as the automatic slipping of the clutch takes place, the driving of the line shaft 19, over the bevel pinions 22, ceases. This action of the slip spring clutches commences at the instant of the change of direction of rotation of the paddle-wheels 9, and at the same instant the driving motion of the paddle-wheels is transmitted through the shafts 15, and through the bevel gearing and spur pinions 35, and 36, to the bevel pinions 23, at the opposite side of the line shaft 19, while the slip spring clutches 38, automatically engaging with the teeth of the bevel pinions 23, continue to impart the same direction of rotation also to the line shaft 19.

It is here explained that when the slip spring clutches 31, on one side of the line shaft 19, are imparting positive driving movement to the line shaft 19, the slip spring clutches 38, at the opposite side of the line shaft 19, slip and therefore do not impart motion to the line shaft 19.

From this arrangement of gearing it is obvious that the continuous direction of rotation of the line shaft 19, is obtained by taking the motion for driving it constantly in one direction alternately from the opposite ends of the shafts or axles of the paddle-wheels 9, so that while the rotating motion of the paddle-wheels is alternately reversed, and the slip spring clutches of the gearing at opposite sides of the line shaft are alternately automatically engaged for driving the line shaft 19, and engaged for driving the said line shaft, that by means of the introduction of the reversing driving gear consisting of the shafts 33, and 25, and the spur pinions 36, and 35, carried thereon, and rotated thereby, that the reversing rotatory movement of the paddle-wheels is so transmitted that the constant direction of rotation of the line shaft 19, is not interfered with.

The line shaft 19, is carried in bearings 41, attached to the top portion of the rectangular framing in which the entire mechanism is carried, and upon the line shaft there are carried the bevel pinions 42, 42, each of which gears into and with other bevel pinions 43, and 44, respectively, upon the crank shafts 45, suitably carried for rotating in bearings. The cranks 46, of the crank shafts 45, are connected by coupling rods 47, 47, and 48, 48, to the plunger rods 49, of the several pumps 50, and as shown by the drawings the object of the gearing or mechanism operating between the paddle-wheels 9, and the pumps 50, is to transmute movement and kinetic energy of the waves operating in alternate directions to pump the water of the ocean, sea, or lake upon a coast or shore of which, the mechanism or apparatus constituting my invention is installed for the purpose of raising water by the action of the pumps from the ocean, sea, or lake, and forcing it into one or more reservoirs at a sufficiently high elevation to produce a static head of pressure for driving such machinery as the said head of water is capable of driving, by means of flowing downward through or upon turbines, water-wheels, or other equivalent hydrodynamically driven motors.

In order to avoid the loss of any part of the dynamic energy due to the action of the incoming and outgoing surf waves upon the paddle-wheels 9, the mechanism constituting my invention includes the feature of utilizing, in addition to the alternate rotating motion of the paddle-wheels, the rising and falling motion thereof, for driving additional pumps also for the raising of some of the water to the necessary head in the reservoirs wherein it is stored. For this purpose I carry upon the top of the upper members 1, of the framing of the apparatus or mechanism constituting my invention, a second framing comprised of the horizontal members 51, supported upon the vertical members 52, fastened to the upper members 1, of the framing hereinbefore described.

The upper parts of each pair of shafts 15, carry at or near their tops, the cross bars 53, as shown at Figs. 1, and 3, and for the purpose of producing stiffness of the cross bars 53, stays 54, are used for connecting the cross bars 53, toward their centers to the shafts 15, as shown more particularly at Fig. 3, but in such manner that the shafts 15, can and do rotate in the bearings 55, of the stays 54, as shown at Fig. 3.

Figure 7:
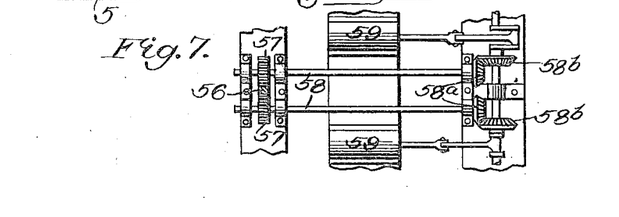
Fig. 7, is a plan of a part of the gear whereby an upper set of pumps is driven by the vertical rise and fall of the paddle-wheels.

At the center of each cross bar 53, there is carried a vertical double rack 56, as shown at Figs. 1, and 3, and in plan at Fig. 7. The teeth on either side of the racks 56, respectively gear into the spur pinions 57, upon the rotatable shafts 58, which by means of bevel gearing 58$^a$, and 58$^b$, drive the pumps 59, by and from which, and by and from the pumps 50, water is raised through the pipes 60, and discharged by the pipes 61, to the reservoir or reservoirs wheresoever it, or they may be located, for the purpose of receiving the water so pumped, and maintaining the water so pumped at the requisite head of pressure.

In order to insure that the surf waves will act upon the paddle-wheels 9, with practical constancy of dynamic at various heights of the tides, the apparatus is so mounted upon the rails 4, at either side thereof, that the apparatus or mechanism constituting my invention, can be moved inward or outward horizontally upon the said rails 4, so as to bring it over the position of the surf waves accordingly as their range of position varies with the successive higher and lower tides; it being here explained that the length of the vertical frames 1ª, is such as to admit of each paddle-wheel descending to an extent corresponding with the depth of immersion in the waves corresponding with its own degree of coefficient of flotation, so that into whatever horizontal position it may be necessary to move my apparatus or mechanism to insure the paddle-wheels being immersed to the depth corresponding to their co-efficient of flotation, the power derived from the surf waves as imparted to said paddle-wheels is by such adjustment rendered practically constant.

For the purpose of moving the mechanism or apparatus constituting my invention horizontally backward and forward for the purposes herein last stated, I mount on either side of the framing carrying my apparatus, the toothed racks 62, which are carried at the inner part of the piers 5, by brackets 63, as shown more particularly at Fig. 3.

Carried in bearings at the under part of the upper horizontal member 1, of the framing, are bearings for the shaft 64, shown at Figs. 1, and 2, and at each end of said shaft 64, is a spur pinion 65, the teeth of which engage with the teeth of the toothed racks 62. so that by rotating the shaft 64, and the toothed pinion 65, in either a right or left hand direction, the entire mechanism constituting my invention is moved horizontally outward or inward to correspond with the range of movement, and change of the range of movement of the surf waves coinciding with each variation in the height reached by the tides, during successive periods of the monthly cycle thereof.

To produce the aforesaid rotation of the shaft 64, and of the pinions 65, a driving pulley 66, is keyed upon the shaft 64, while upon the inner end of the line shaft 19, a driving pulley 67, is also keyed, and a twisted driving belt is placed upon these pulleys so that as the line shaft 19, is driven by the motor mechanism of the apparatus constituting my invention as hereinbefore described, it rotates the pinions 65, in either a right or lefthand direction, and causes the entire apparatus to be moved upon the rails 4, by the pinions 65, engaging with the toothed racks 62.

To effect a change of direction of rotation of the toothed pinions 65, in order to produce the requisite horizontal outward and inward motion of the power transmitting apparatus constituting my invention, I place the driving belt 68, in one of two cross positions over the driving pulleys 67 and the other pulley beneath it on the shaft 64. part of which pulley is shown by the dotted semi-circle 64ª in Fig. 1, so that while crossed in one direction the belt operates as is obvious to rotate the pinions 65, to move the apparatus constituting my invention outward, and when the belt is crossed in the opposite direction it operates to rotate the pinion 65, and to move the mechanism constituting my invention inward. It is not, however, essential that the inward and outward horizontal movement of the apparatus or mechanism constituting my invention, should be effected by a cross driving belt and pulleys 66, and 67, as by placing a winch handle upon either end of the shaft 64, outside the pinions 65, the attendants of the mechanism by rotating such winch handles can move a considerable sized wave power apparatus or mechanism inward or outward.

Figure 5:
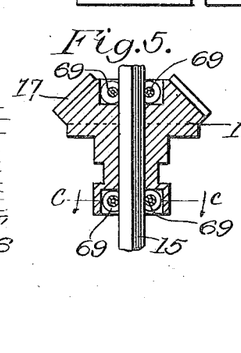
Fig. 5, is a transverse section on an enlarged scale of one of the bevel gears, showing the rotating vertical shaft driven by the paddle-wheels and the rollers within said gear, between which said vertical shaft moves vertically, both upward and downward, and rotates said bevel gear.
Figure 6:
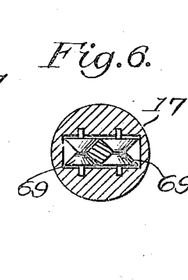
Fig. 6, is a horizontal section on the line c, c, Fig. 5.

With the view of diminishing the friction of the shafts 15, in rising and descending through the bevel pinion 17, I preferably form the upper part of said shafts 15, square, as shown more particularly in enlarged view in Figs. 5, and 6. These square portions of the shafts 15, move upward and downward in the space between two grooved anti-friction rollers 69, carried on axes in recesses preferably in the upper and lower parts of each pinion 17, as distinctly shown in Figs. 5, and 6. The grooves in the anti-friction rollers 69, are of such form and dimensions as to correspond with the squareness and rectangularity of the rising and falling shafts 15, so that they operate with a minimum of friction and do not become disengaged from their function of rotating the several bevel pinions 17.

In the preceding parts of this specification, and in the drawings Figs. 1, to 7, I have described the means of conveying the rotatory motion of the paddle wheels to the line shaft as consisting of two respective sets of toothed gearing, said toothed gearing being so arranged as to drive the line shaft continuously in one direction of rotation. I here point out, however, that the mechanism for conveying the motion and energy of the paddle-wheels of my apparatus or mechanism to the line shaft thereof, may be considerably simplified by substituting driving belts and pulleys for conveying alternate rotatory motion of the paddle-wheels to drive either the line shaft 19, shown at Figs. 1, 2, and 3, of the annexed drawings, or a crank shaft substituted for said line shaft. With the object of thus simplifying the mechanism, I, instead of taking the vertical shafts 15, through the bevel pinions 17, substitute for the bevel pinions 17, the belt pulleys 17ª, shown at Figs. 8, and 9. These belt pulleys 17ª, are provided with anti-friction rollers 69ª, within them in the same manner as hereinbefore described with reference to, and shown at Figs. 5, and 6, of the drawings. The bevel wheel 17, Fig. 5, however, is under this construction of my invention, dispensed with, and in lieu thereof the part corresponding with the bevel teeth in the pinion 17, hereinbefore described, is substituted by a grooved belt driving pulley $17^a$. The shafts 15, operate upward and downward in the driving pulleys $17^a$, in the same manner as hereinbefore described with reference to the operation of the shafts 15, in the bevel pinions 17, shown at Figs. 1, 2, 3, and 5, of the annexed drawings.

Figure 8:
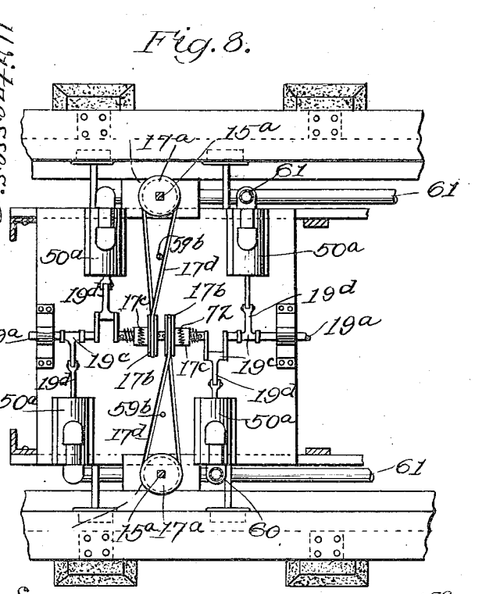
Fig. 8, is a plan of part of my apparatus or mechanism wherein the line shaft instead of being driven by toothed gearing is operated by driving belts actuated by the paddle-wheels, this figure also showing the substitution of a crank shaft instead of a continuous line shaft.

Upon the shaft 19, which as aforesaid may be the same line shaft 19, as hereinbefore described and shown at Figs. 1, 2, and 3, of the drawings, or which may be the crank shaft $19^a$, shown at Fig. 8, there are carried other pairs of belt or rope driving pulleys $17^b$, corresponding with the two belt or rope driving pulleys $17^a$, on the shafts 15, respectively. Each of the belt or rope pulleys $17^b$, on the crank shaft $19^a$, is provided with a slip spring clutch $17^c$, one part of each of which clutches is engaged firmly, but slidably upon a key in the crank shaft $19^a$, so as to rotate therewith, and when either of the belts or rope driving pulleys $17^b$, engages with its clutch portion $17^c$, then the belt or rope $17^d$, operated by either of the driving pulleys $17^b$, causes the rotation of the crank shaft $19^a$, and the crank shaft $19^a$, is accordingly rotated correspondingly with the rotation of the paddle-wheels $9^a$, by the surf waves. As, however, the rotation of the paddle-wheels $9^a$, is alternately in opposite directions as hereinbefore described, and as it is necessary that the crank shaft should rotate constantly in the same direction, the clutches $17^c$, are so arranged as to be engaged by their respective driving pulleys $17^b$, so that while either of the driving pulleys $17^b$, is engaged with its clutch $17^c$, to rotate the crank shaft $19^a$, the other driving pulley $17^b$, and its clutch teeth slip over each other and do not operate to drive the crank shaft until the rotation of that crank shaft by the completion of the rotation in one direction of the paddle-wheel $9^a$, is completed; then at that instant of change of direction of rotation of the paddle-wheel the other driving pulley $17^b$, engages with its clutch on the crank shaft $19^b$, and the rotation of the crank shaft $19^a$, is continued in the same direction while the paddle-wheel $9^a$, is rotating in the opposite direction.

Figure 9:
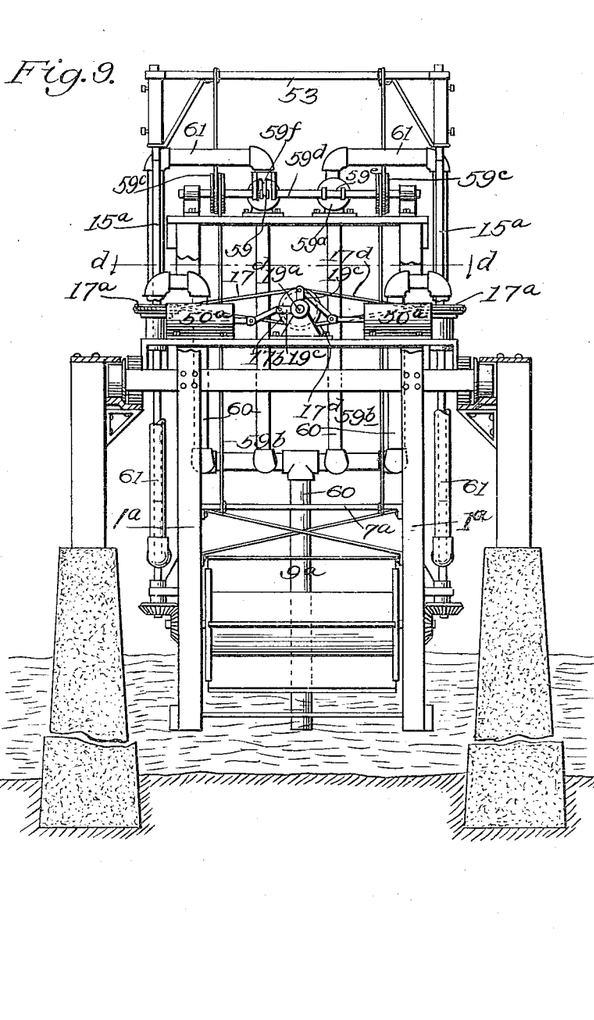
Fig. 9, is an end elevation corresponding to Fig. 8.
Figure 10:
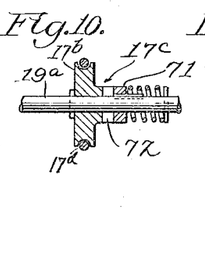
Fig. 10, is an enlarged sectional detail of one of the driving pulleys on one of the horizontal rotating shafts.

In the drawing Fig. 8, I have not shown the paddle-wheels situated beneath the belt and rope driving gear, but one of the said paddle-wheels is shown in the end elevation Fig. 9, and it is to be understood that the gearing shown at Figs. 8 and 9, for transmitting the alternate rotation of the paddle-wheel $9^a$, to the crank shaft $19^a$, may be similarly applied to convey and transmute the alternate rotatory motion of any required number of paddle-wheels, so as to produce continuous rotation in one direction of a line shaft, or a crank shaft.

The several cranks $19^c$, of the crank shaft $19^a$, are coupled by connecting rods $19^d$, to the several pumps $50^a$, for the purpose of raising water by the pipes 60, from the ocean, or other large body of water, in or whereat the apparatus or mechanism constituting my invention is located, and for discharging water so lifted by the pipes 61, into tanks or reservoirs at any required heights or heads for practical utilization of the energy of the water so raised.

With the object of employing driving belts or ropes for operating the upper sets of pumps $59^a$, Fig. 9, corresponding with the pumps 59, in Figs. 1, and 3, instead of the gearing hereinbefore described with reference to, and shown at Figs. 1, 3, and 7, of the annexed drawings, I attach the lower ends of two ropes or belts $59^b$, to the upper part of the frame $7^a$, of each paddle-wheel $9^a$, then lap the said ropes around the driving pulleys $59^c$, carried upon the crank shafts $59^d$, then fasten the upper end of said ropes to the upper cross bar 53. By this arrangement, as the framing $7^a$, and the cross bar 53, of each paddle-wheel gearing rises and falls by the action of the waves lifting and lowering the respective floating paddle-wheels $9^a$, the pulleys $59^c$, upon the crank shafts $59^d$, are rotated alternately in opposite directions, while the plungers in the pumps $59^a$, are driven by the cranks $59^e$, through being coupled by the connecting rods $59^f$.

Figure 11:
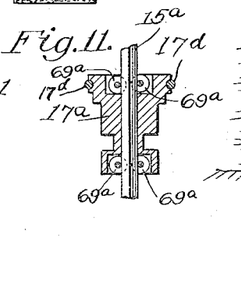
Fig. 11, is an enlarged longitudinal section of one of the driving pulleys operating on a vertical shaft, driven by the paddle wheels, and the rollers within said pulleys, between which said vertical shaft moves and rotates said pulleys.

With respect to the construction of the driving pulleys $17^a$, operating upon the shafts $15^a$, shown in enlarged sectional detail in Fig. 11, it will be observed that the only difference in the construction thereof as compared with the construction of the bevel gear shown also in enlarged view in Fig. 5, is that in place of the teeth of the bevel gear shown in Fig. 5, the belt or rope grooved pulley $17^a$, is substituted.

The pipes 61, convey the water pumped by all the sets of pumps 50, 59, and $50^a$, $59^a$, to the reservoir or reservoirs wherein the water lifted by the several pumps is stored as a head of water, said reservoir or reservoirs being well understood and not shown in the drawings, because of not constituting any part of my said invention.

I claim as my invention.

1. The mechanism or apparatus operated by the incoming and outgoing surf waves of a large body of water, consisting of a horizontally movable and adjustable framing, carried on rails or equivalent supports, vertical guides in said framing, a vertically movable slide in each of said vertical guides of said framing, wherein the bearings of floating paddle-wheels are situated, there being a plurality of such vertical guides, a plurality of such bearings, and a plurality of such floating paddle-wheels, toothed gearing at each end of the shafts of the paddle-wheels, said toothed gearing rotating vertical shafts, said vertical shafts rotating by transmission means horizontal shafts upon which are carried wheels provided with automatic slip spring clutches, said wheels provided with said clutches rotating a line shaft, the transmission gear operated from both ends of each floating paddle-wheel being arranged so that while said paddle-wheels are alternatingly rotated in opposite directions by the action of the incoming and outgoing surf waves upon said paddle-wheels, the transmission gear rotates the line shaft continuously in one and the same direction, said line shaft operating crank shafts on either side of the line shaft, the cranks of said shafts operating reciprocating pumps, the rising and falling rotating vertical shafts carrying at their upper parts frames with gearing for rotating other crank shafts for operating other pumps, the whole of said sets of pumps being connected to water lifting and discharge pipes, whereby water is raised from the body of water, whose surf waves operate the paddle-wheels and the other parts of the mechanism, and said water is forced into reservoirs at a height sufficient to maintain the head of water necessary for driving turbines, water-wheels, or other motive power mechanism, substantially as set forth.

2. Mechanism or apparatus operated by the inward and outward motion of surf waves, comprising paddle wheels constructed to float and rise and fall with the undulating movement of said waves, driving a power-transmitting mechanism; a series of pumps; transmission gear connected with said wheels for in part rotating a line shaft in one constant direction of rotation, and in part by the rising and falling motion of the paddle wheels operating other rotating transmission gear, both sets of gear operating said pumps for lifting water substantially as described.

3. The mechanism or apparatus operated by the incoming and outgoing surf waves of a large body of water, consisting of a horizontally movable and adjustable framing, vertical guides in said framing, a vertically movable slide in each of said vertical parallel guides, wherein the bearings of floating paddle-wheels are situated, there being a plurality of such vertical guides, a plurality of such bearings, and a plurality of such floating, rotating, rising and falling paddle-wheels, toothed gearing at each end of the shafts of the paddle-wheels, said toothed gearing rotating vertical shafts, said vertical shafts each carrying a pulley for driving by flexible transmission means, horizontal shafts upon which are carried wheels provided with automatic slip spring clutches, said wheels provided with said clutches rotating a crank shaft, transmission gear operated from both ends of each floating paddle-wheel being arranged so that while said paddle-wheels are alternatingly rotated in opposite directions by the action of the incoming and outgoing surf waves upon said paddle-wheels, the transmission gear rotates the crank shaft continuously in one and the same direction, said crank shaft operating reciprocating pumps, the rising and falling rotating vertical shafts carrying at their upper ends frames with gearing for rotating other crank shafts for operating other pumps carried by said upper frame, the whole of said sets of pumps being connected to water lifting and discharge pipes, whereby water is raised from the body of water whose surf waves operate the paddle-wheels and the other parts of the mechanism, the whole of said pumps forcing said water into reservoirs at a height sufficient to maintain the head necessary for driving turbines, water-wheels, and other motive power mechanism.

4. Mechanism or apparatus operated by the inward and outward motion of surf waves, comprising paddle wheels, constructed to float, to rotate, and to rise and fall with the undulating movement of said waves, so that as the waves rise and fall the floating paddle wheels correspondingly rotate, rise and fall, thereby insuring a practically constant driving power being imparted to said paddle wheels, pumps, gear for effecting the transmission of the driving power due to the rotation of the paddle wheels to a shaft in one constant direction of rotation, thereby operating one set of pumps, and means operated by the rising and falling motion of the paddle wheels for operating other transmission gear, driving the shaft of the other set of said pumps, substantially as described.

5. In a wave motor, a movable frame, supports therefor, guides in said frame, a movable slide in each guide, a paddle wheel journaled in said slide, a line shaft, transmission gear connected with said line shaft and said paddle wheel for driving said line shaft continuously in one direction, and pumps operated by said line shaft, substantially as described.

6. In a wave motor a movable frame, supports therefor, guides in said frame, a vertically movable slide in each guide, a paddle wheel journaled in the slides, a line shaft, transmission gear connected with said line shaft and said paddle wheel for driving the line shaft continuously in one direction, transmission gear connected with said slide and pumps operated by each of said transmission gears, substantially as described.

7. In a wave motor, a movable frame, supports therefor, guides in said frame, a vertically movable slide in each guide, a paddle wheel journaled in the slides, transmission gear connected with and rotated by the rotary movement of said wheel, other transmission gear connected with the vertically movable slides and adapted to be rotated thereby, and separate sets of pumps driven by each set of driving gear, substantially as described.

8. In a wave motor, a movable frame, supports therefor, guides in said frame, a vertically movable slide in each guide, a paddle wheel journaled in the slides, transmission gear connected with and rotated by the rotary movement of said wheels, other transmission gear connected with the vertically movable slides and adapted to be rotated thereby, and separate sets of pumps driven by each set of driving gear, substantially as described.

9. In a wave motor, a movable frame, supports therefor, guides in said frame, a vertically movable slide in each guide, a paddle wheel journaled in the slides, a revoluble shaft, means connected with one end of said paddle wheel to rotate said shaft, other means to rotate said shaft in the same direction when the paddle wheel is turning in the reverse direction, driving gear connected with the slides to rotate a second shaft, and pumps operated by said shafts, substantially as described.

In testimony whereof, I, the said JOHN WILLY, have hereunto set my hand and seal at the city of Los Angeles aforesaid, in the presence of two subscribing witnesses.

JOHN WILLY. [L. S.]

Witnesses:
St. John Day,
Willis I. Morrison

Copies of this patent may be obtained for five cents each, by addressing the "Commissioner of Patents, Washington, D. C."